JOHN H. SMITH
INVENTOR

BY Hayden & Pravel
ATTORNEYS

United States Patent Office 3,529,672
Patented Sept. 22, 1970

3,529,672
ROW MARKER APPARATUS
John H. Smith, Jonesville, La., assignor to Kimberly-Clark Corporation, Neenah, Wis., a corporation of Delaware
Filed June 21, 1967, Ser. No. 647,754
Int. Cl. A01b 33/02
U.S. Cl. 172—123                                     1 Claim

ABSTRACT OF THE DISCLOSURE

A row marker apparatus for use with a tiller for shaping earthen rows of cultivated or farmed land or other suitable apparatus for marking the rows traversed by the tiller to enable the operator to determine which earthen rows have been traversed.

BACKGROUND OF THE INVENTION

Field of the invention

This invention relates to a row marker apparatus and more particularly to a new and improved row marker apparatus.

Description of the prior art

A tiller is a device for shaping and "working" rows of farmed or cultivated land. Prior tillers or other type devices for plowing and farming have been at a disadvantage because of the lack of an apparatus for marking the rows or area of land that was traversed or passed over by the tillers or other apparatus.

SUMMARY OF THE INVENTION

Briefly, the row marker apparatus of the present invention includes a rotatable shaft secured to a rotary shaft of a tiller machine by a hingedly mounted, releasable means, a rotatable means for marking a row or adjacent land, a hinge means for arcuately adjusting the shaft to enable the rotatable means to adapt to the contour of the earthen land or ground, and hinge means secured with the power means for arcuately moving the rotating shaft and means for marking when the hingedly mounted, releasable means is released or disconnected from the shaft of the tiller apparatus.

DESCRIPTION OF THE PREFERRED EMBODIMENT

Figure 1:
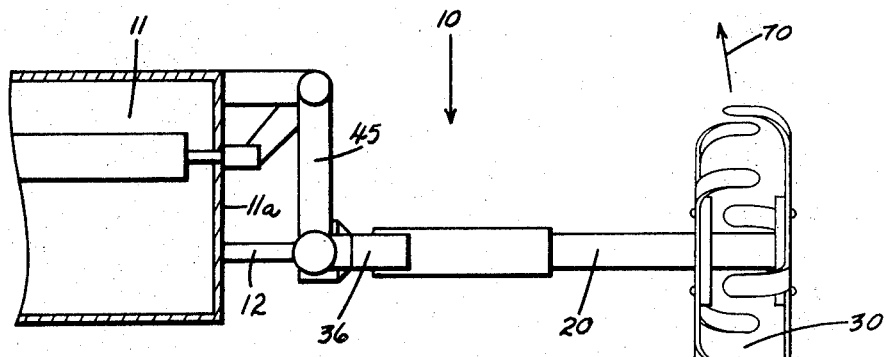
FIG. 1 is a side view marker apparatus of the present invention illustrating a rotatable shaft and fixed blades mounted therewith secured with a rotatable shaft of a tiller machine or other apparatus.
Figure 2:
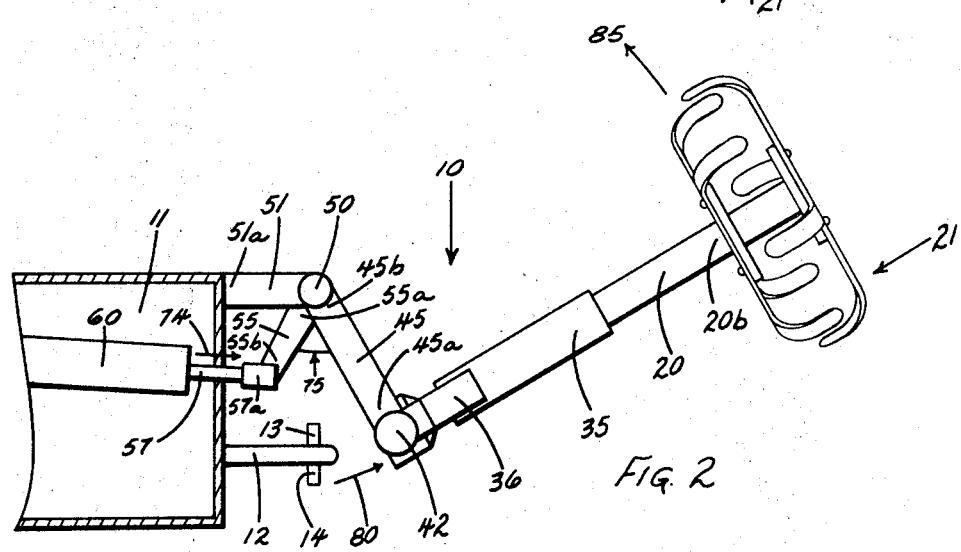
FIG. 2 is a side view of the row marker apparatus of the present invention disconnected from the rotatable shaft of the tiller machine and being rotated about a means with said rotatable shaft of the present invention for enabling the shaft and the blades to be arcuately moved at disconnection.
Figure 3:
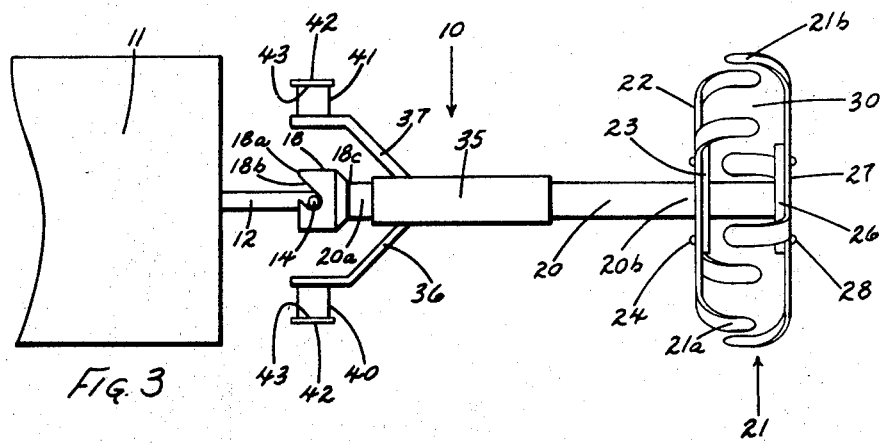
FIG. 3 is a partial top view of the row marker apparatus of the present invention illustrating a releasable hinge means secured with an end of the rotating shaft of the tiller machine and a bracket and pivot means secured with a sleeve means which encircles the rotatable shaft of the present invention.

Attention is directed to FIGS. 1, 2, and 3 of the present invention wherein the row marker apparatus of the present invention is generally designated by the numeral 10. The row marker apparatus 10 of the present invention is used with a tiller machine or other suitable apparatus, such as designated at 11, or a portion of a rotary tiller machine as illustrated. The rotary tiller machine 11 includes a powered rotatable shaft 12 which extends outwardly from the side 11a of the tiller 11. The rotatable shaft 12 rotates suitable blades and the like for shaping open rows in the field or for working plowed or cultivated land, as is well known in the art.

As illustrated in FIGS. 2 and 3, extension members 13 and 14 are mounted with the end of the shaft 12 by any suitable means such as insertion through a hole (not shown) in the end of the shaft 12 so that the extension members 13 and 14 extend outwardly transverse to the shaft 12. A releasable hinge means or disconnecting universal joint 18 includes an opening (not shown) in an end 18a for receiving the end of the shaft 12. A pair of oppositely shaped arcuately disposed ears 18b (only one of which is shown) receives one of each of the extension members 13 and 14 for suitably connecting and locking the releasable hinge means 18 with the end of the shaft 12.

The other end 18c of the releasable hinge means 18 is secured with an end 20a of a shaft 20 by any suitable means such as welding. The other end 20b of the shaft 20 receives a plurality of curved blades generally designated at 21. A first set of curved blades 21a includes a central circumferential member 22 having an opening (not shown) therein for being positioned on the end 20b of the shaft. A retaining member 23 is fixedly secured with the shaft, and suitable nut and bolt means 24 secured with the member 23 and circumferential member 22 for fixedly mounting the blades 21a with the end 20b of the shaft 20. The plurality of blades 21 also includes the set of blades 21b which includes a circumferential, central member 26 for receiving the end 20b of the shaft. A fixed circumferential member 27 is mounted with the shaft and the member 27 and circumferential member 26 are fixedly secured to each other by suitable nut and bolt means 28. It should be noted that in the embodiment illustrated that the blades 21b are curved inwardly toward the tiller machine 11 and the blades 21a are curved outwardly toward the end 20b of the shaft 20 such that the ends of the blades 21 alternately extend into the area or space 30 between each of the sets of blades 21a and 21b.

As illustrated in FIGS. 1, 2, and 3, a sleeve means or bearing means 35 is concentrically positioned around the rotatable shaft 20 adjacent the end 20a of the shaft 20. A pair of bracket means 36 and 37 is secured on each side of the sleeve means 35 and extend outwardly and rearwardly toward the end 11a of the machine 11 adjacent the releasable hinge means 18. One of each of the bracket means 36 and 27 is positioned on each side of the releasable hinge means 18 and adjacent the end of the tiller machine 11. One of each of a pair of pivot means 40 and 41 is secured with one of each of the bracket means 36 and 37, respectively, and each includes annular edge means or lip means 42 which is secured with an end 43 of each of the pivot members 40 and 41 opposite from the ends of each of the pivot means 40 and 41.

As illustrated in FIGS. 1 and 2, a pair of fixed support means 45 (only one of which is shown) is each pivotally secured at one end 45a to one of each of the pivot means 40. The ends 45a of each of the fixed support means 45 is prevented from slipping off the ends 43 of each of the pivot means 40 and 41 by the annular lips 42. Each of the fixed support means extends upwardly and is rigidly secured at an end 45b to circumferential member 50.

The circumferential member 50 is secured to an adapting member 51 which is secured by any suitable means such as welding adjacent an end 51a to the tiller machine 11. As illustrated in FIGS. 1 and 2, the adapting member 51 extends outwardly from the end of the tiller machine 11 and includes an opening (not shown) for receiving the member 50. It is to be understood that the member 50 is adapted to rotate in the opening of the adapter member 51.

A fixed bracket or support 55 is secured at one end 55a with the member 50 and is fixedly secured at another end 55b with an end 57a of a hydraulic plunger 57. It is to be understood that the member 55 may be secured with the fixed support member 45 or that the members 45, 50, and 55 may be adapted in any suitable manner such that the fixed support member 45 and the member 55 remain at a fixed angle relative to each other.

As illustrated in FIGS. 1 and 2, the hydraulic plunger 57 extends outwardly from a suitable hydraulic cylinder 60 (only a portion of which is shown) for moving the plunger 57 inwardly and outwardly by any suitable actuation means (not shown) as is well known in the art.

In the operation of the invention, the extension members 13 and 14 are positioned in the oppositely positioned dog openings 18b such that rotation of the shaft 12 of the tiller machine 11 imparts rotation to the hinge release means 18 and the shaft 20 connected thereto. The rotation of the shaft 20 imparts rotation to the plurality of blades 21 so that as the blades contact the earthen formation the formation is marked in some suitable manner so that the operator of the tiller machine or other suitable apparatus can determine what area of the field has been worked.

As illustrated in FIG. 1 and as set forth hereinabove, one of each of the fixed support brackets 45 is secured with one of each of the pivot means 41 and 40 to help support the shaft 20 and sleeve means 35 adjacent the shaft 12. As the tiller machine 11 passes over uneven field or ground, the brackets 36 and 37 and connected pivots 40 and 41, respectively, pivot about the ends 45a of each of the fixed support brackets 45 to enable the plurality of blades 21 and end 20b of the shaft 20 to pivot upwardly in the direction of the arrow 70 or downwardly in the direction of the arrow 71 relative to the adjacent open formation so that the plurality of blades 21 is continuously positioned adjacent the earthen formation for marking thereof as explained hereinabove. As illustrated in FIG. 3, the shaft 20 and releasable hinge means 18 pivot about the extension members 13 and 14 as the brackets 36 and 37 and the respective pivot means 40 and 41 pivot about each of the ends 45a of the each of the fixed support brackets 45.

If it is desired to disconnect the shaft 20 from the rotatable power shaft 12 of the tiller machine 11, the releasable hinge means 18 is pivoted or rotated to remove the extension members 13 and 14 from each of the respective oppositely shaped dog openings 18b such as illustrated in FIG. 2. The hydraulic cylinder 60 is thereafter actuated to move the hydraulic plunger 57 outwardly in the direction of the arrow 74 which also moves the fixed member 55 secured with the end 57a of the plunger 57 in the direction of the arrow 74. As brought out hereinabove, the fixed support members 45 are fixedly secured to the member 50 such that the angle designated at 75 remains constant and such that movement of the member 55 causes the member 50 and the pair of fixed bracket members 45 fixedly secured thereto to rotate arcuately upwardly in the direction of the arrow 80. Such arcuate upward movement in the direction of the arrow 80 also moves the releasable hinge means 18, sleeve means 35, brackets 36 and 37, and shaft 20 upwardly to the desired position wherein the shaft 20 may be gripped by an individual or user and the brackets 36 and 37 and respective pivot means 40 and 41 rotated about each of the ends 45a of the pair of fixed support brackets 45 by such user and in the direction of the arrow 85 (FIG. 2) so that the sleeve means 35 and end 20b of the shaft 20 may be placed or positioned for storage or resting on the tiller machine 11.

What is claimed is:
1. A row marker apparatus for use with a rotatably powered first shaft comprising:
   (a) releasably mounted universal joint means secured with an end of the rotating first shaft;
   (b) a second shaft secured at one end with said universal joint means wherein rotation of the first shaft imparts rotation to said second shaft, said second shaft extending outwardly transversely to the earthen rows or the worked earthen area;
   (c) a plurality of fixed blades secured transversely to the opposite end of said second shaft wherein rotation of said second shaft imparts rotation to said blades;
   (d) said universal joint enabling said second shaft and said blades to arcuately move in response to changes in the elevation of the adjacent earthen rows wherein the rotating blades continuously contact and mark the adjacent earthen formation or land as the elevation of the land changes;
   (e) arm lifting means pivotally mounted at one end adjacent said second shaft; and
   (f) power means secured at a fixed angle to the other end of said arm lifting means wherein actuation of said power means causes the fixed angle end of said arm lifting means to be rotated upwardly for enabling said second shaft and fixed blades to be rotated about the pivotal end of said arm lifting means for removal of said blades from adjacent the earthen formation.

References Cited
UNITED STATES PATENTS

| 533,452 | 2/1895 | Frey et al. | 111—32 X |
| 819,409 | 5/1906 | Cheesman | 172—132 |

ROBERT E. PULFREY, Primary Examiner

W. J. CONLON, Assistant Examiner

U.S. Cl. X.R.

111—33; 172—126, 132

UNITED STATES PATENT OFFICE
CERTIFICATE OF CORRECTION

Patent No. 3,529,672                                   September 22, 1970

John H. Smith

It is certified that error appears in the above identified patent and that said Letters Patent are hereby corrected as shown below:

In the heading to the printed specification, lines 3 to 5, "John H. Smith, Jonesville, La., assignor to Kimberly-Clark Corporation, Neenah, Wis., a corporation of Delaware" should read -- John H. Smith, Route A, Box 36, Jonesville, La. 71343 --.

Signed and sealed this 6th day of April 1971.

(SEAL)
Attest:

EDWARD M. FLETCHER, JR.                        WILLIAM E. SCHUYLER, JR.
Attesting Officer                                Commissioner of Patents